(12) United States Patent
Harjanto

(10) Patent No.: US 7,296,022 B2
(45) Date of Patent: Nov. 13, 2007

(54) METHOD AND SYSTEM FOR ACCESSING A NETWORK DATABASE AS A WEB SERVICE

(75) Inventor: Andy Harjanto, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 10/619,349

(22) Filed: Jul. 14, 2003

(65) Prior Publication Data

US 2005/0015375 A1 Jan. 20, 2005

(51) Int. Cl.
G06F 7/00 (2006.01)
G06F 15/16 (2006.01)
G06F 15/173 (2006.01)
G06F 15/177 (2006.01)
G06F 17/00 (2006.01)
G06F 17/30 (2006.01)

(52) U.S. Cl. .................. 707/10; 707/1; 707/104.1; 709/217; 709/220; 709/223; 709/230

(58) Field of Classification Search ........... 709/201, 709/217, 220, 223, 230; 707/7, 104.1, 501.1, 707/2, 1, 10; 712/35; 714/38
See application file for complete search history.

(56) References Cited

U.S. PATENT DOCUMENTS

| | | | | |
|---|---|---|---|---|
| 5,392,448 A | * | 2/1995 | Frankel et al. | 712/35 |
| 5,701,451 A | * | 12/1997 | Rogers et al. | 707/1 |
| 5,710,918 A | * | 1/1998 | Lagarde et al. | 707/10 |
| 5,721,908 A | * | 2/1998 | Lagarde et al. | 707/10 |
| 5,745,754 A | | 4/1998 | Lagarde et al. | |
| 5,752,246 A | * | 5/1998 | Rogers et al. | 707/10 |
| 5,761,663 A | * | 6/1998 | Lagarde et al. | 707/10 |
| 5,793,964 A | * | 8/1998 | Rogers et al. | 709/202 |
| 5,974,416 A | * | 10/1999 | Anand et al. | 707/10 |
| 6,192,415 B1 | * | 2/2001 | Haverstock et al. | 709/245 |
| 2001/0034743 A1 | * | 10/2001 | Thomas | 707/501.1 |
| 2002/0035559 A1 | * | 3/2002 | Crowe et al. | 707/2 |
| 2003/0233360 A1 | * | 12/2003 | Tan | 707/7 |
| 2004/0088713 A1 | * | 5/2004 | Myllymaki et al. | 719/315 |
| 2004/0162871 A1 | * | 8/2004 | Pabla et al. | 709/201 |
| 2004/0267808 A1 | * | 12/2004 | Matsushima | 707/104.1 |
| 2005/0193269 A1 | * | 9/2005 | Haswell et al. | 714/38 |

OTHER PUBLICATIONS

Scott Short, Building XML Web Services for the Microsoft.NET platform, Feb. 27, 2002, Microsoft Press, Relevat Chapters: 1, 5-7, and 11.*

(Continued)

Primary Examiner—Wilson Lee
Assistant Examiner—Patrick A. Darno
(74) Attorney, Agent, or Firm—Workman Nydegger

(57) ABSTRACT

A method and system for accessing network directory data as uses a Web service as an interface between a directory database and network clients. To support extensibility of the object types in the directory database, directory access methods are defined for a generic object class from which classes for different directory object types are derived. A description of the object classes and database operation methods is provided by the Web service to the client. To access the directory database, the runtime environment of the client is used to create objects on which a requested directory operation method operates according to the proper class definitions of the object types. The request with serialized objects is sent to the Web service, which then uses information provided by the objects in the request to access the directory database to carry out the requested directory operation method.

21 Claims, 4 Drawing Sheets

OTHER PUBLICATIONS

Short, Scott, Building XML Web Services for the Microsoft.NET Platform. Feb. 27, 2002, Microsoft Press—Only chapter 9 is being furnished with this office action. Relevant portions of the text have been provided with previous office actions.*

Shiran, Yehuda, Extending a Class to a Web Service, Jul. 3, 2002, http://www.webreference.com/js/tips/020703.html.*

* cited by examiner

METHOD AND SYSTEM FOR ACCESSING A NETWORK DATABASE AS A WEB SERVICE

TECHNICAL FIELD

This invention relates generally to computer networks, and more particularly to the operations of accessing a network database, such as a network directory service, to perform database operations on objects in the database.

BACKGROUND OF THE INVENTION

Web services are a new and rapidly growing technology that promises to revolutionize the way business-to-business and business-to-consumer services are provided and used. Web services comprise web-based applications that dynamically interact with other Web applications based on open standards that include XML, UDDI and SOAP. XML ("EXtensible Markup Language") is at the core of the Web services and provides a mechanism for communications with the Web services. SOAP ("Simple Object Access Protocol") is the connection protocol that describes envelope and message formats for messages used to communicate with the Web services and has a basic request/response handshake protocol. The Web services can register themselves in a UDDI ("Universal Description, Discovery and Integration") directory to allow others on the network to discover them. The Web Services Description Language (WSDL) is an XML-based language commonly used for describing the capabilities of the Web services and the protocols and formats used by the services. When a client wants to use a Web service, it first queries the Web service, and the service sends its WSDL description to the client to enable the client to use its service.

Directory service is one of the most common forms of services used in the Internet or other large networks. With the trend to run services on the Internet as Web services, it is desirable to implement directory service in such a way that the directory data are accessed as a form of Web service. It is, however, not a straightforward matter to convert current directory services into Web services. Web services normally use SOAP over HTTP as the transport, which is stateless in nature. This brings several challenges in making a session-oriented protocol, such as LDAP ("Lightweight Directory Access Protocol") that is commonly implemented in directory services, to act as a Web service. In addition to this issue, another challenge is to design a simple way to access the directory service that fits the simple request/response model of current Web services. A chatty protocol is not desirable in designing Web services. Also, it is preferable to keep the directory operations simple and concise to conform to the CRUD ("Create, Read, Update, Delete") model.

Another important requirement for implementing directory access as a Web service is that the system has to be able to handle the addition of new types of directory objects effectively, since typical directory services schema is extensible. As the usage of the Internet is rapidly expanding, there are needs to allow new types of directory objects to be added to the directory service database. To that end, the schema of the directory service database should be extensible. The addition of new directory object types, however, creates the issue of how a client can access objects of those new types. In this regard, it is not desirable or practical to add new methods for accessing each new object type as the new classes appear in the directory service database schema.

Thus, to sum up, there is a need to create a non-chatty, generic, set of web methods that allow the use of simple CRUD operations For accessing directory data as a Web service, while still supporting extensibility of the directory service schema such that new directory object types can be access accessed without the need to add new directory operation methods in the client code.

SUMMARY OF THE INVENTION

In view of the foregoing, the present invention provides a method and system for accessing objects in a network database, such as a directory service, as a Web service that is simple, flexible as well as extensible. The new approach of the invention creates a non-chatty, generic, and immutable CRUD model that enables a client to retrieve a set of heterogeneous object types and perform a batch directory operation. Moreover, the method and system of the invention is extensible in that new object types may be added to the directory database schema without the need to create new methods to access those new object types.

The present invention leverages the aspects of object-oriented programming and combines them with the ability of a runtime environment (e.g., the Common Language Runtime (CLR) developed by Microsoft Corporation for the NET platform) to use metadata to properly create objects of different types to provide a simple yet flexible and extensible way to access a directory database or the like, in the system of the invention, a Web service for accessing a database works as an intermediate between clients and the database server. In accordance with the invention, the types of objects available from the database are defined by classes derived from a generic object type class, and data defining the types of the objects are included as metadata associated with the classes of the directory object types. The class definition with the associated metadata are provided by the Web service via WSDL. in formation to the client. When the client makes a request to perform a database operation (e.g., creating or searching for objects), the runtime library of the client uses the metadata to property create objects of the types referred to in the request, and includes the serialized objects in the request. When the Web service receives the request, it is able to use the objects to access the database to carry out like requested database operation. With this approach, a diverse and readily extensible set of object types can be accessed, and different directory object types may be returned by the server in response to a single search. Moreover, it allows third parties to extend the directory database schema and participating in the Web services without the need to change the WebMethod signature or modifying an existing application.

DETAILED DESCRIPTION OF THE INVENTION

Figure 1:
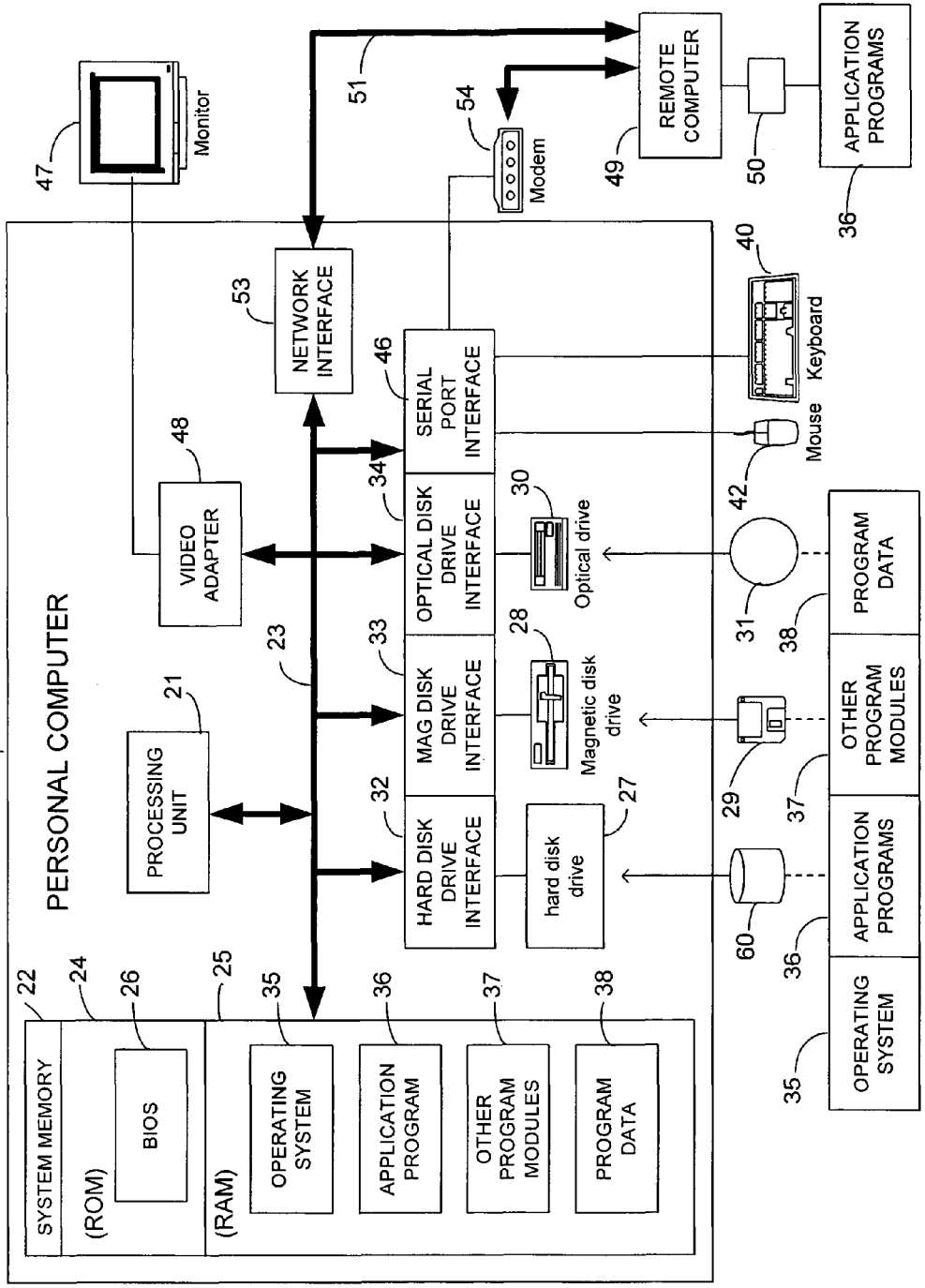
FIG. 1 is a block diagram generally illustrating an exemplary computer system on which an embodiment of the client or server for accessing directory data as a Web service in accordance with the invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 3:
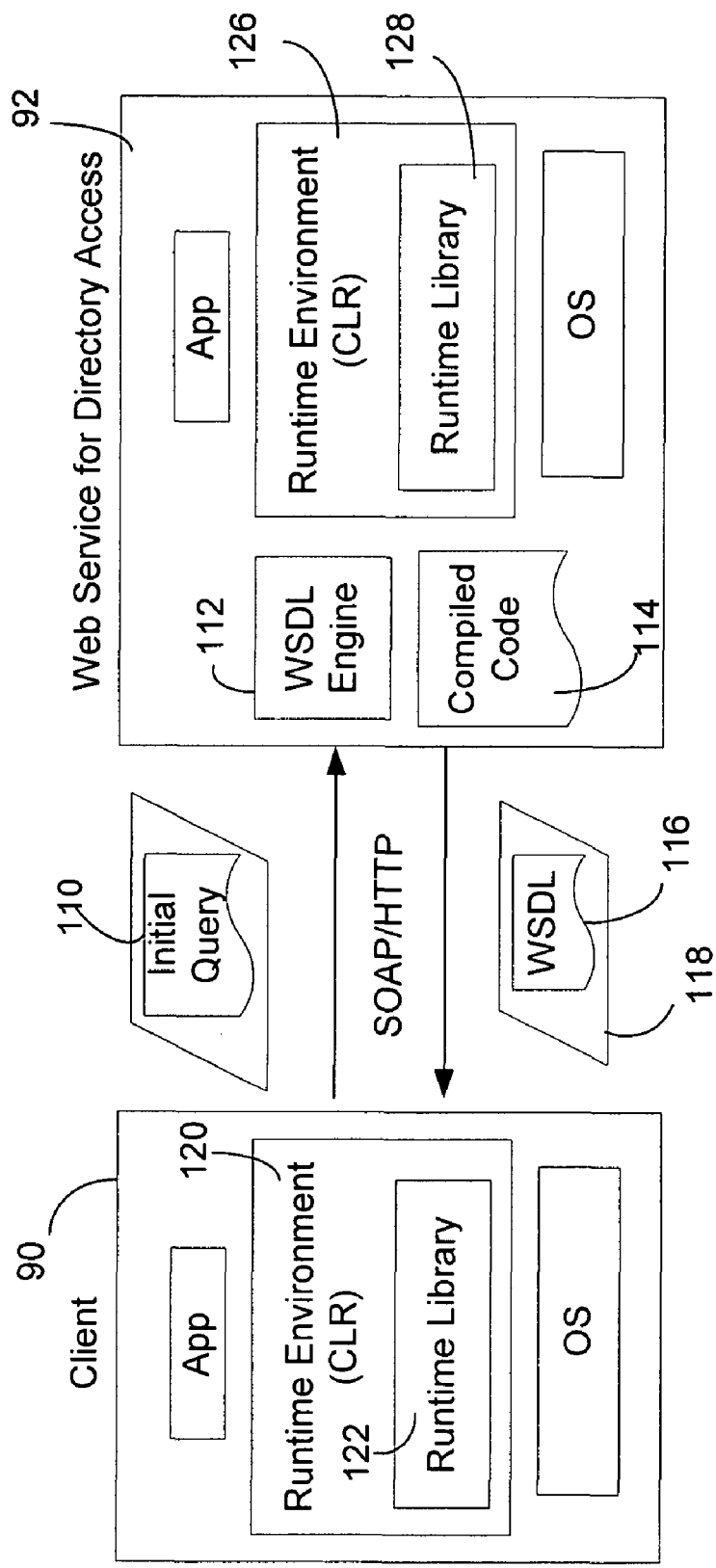
FIG. 3 is a schematic diagram showing the sending of a WSDL document with metadata from the Web service to a network client.
Figure 4:
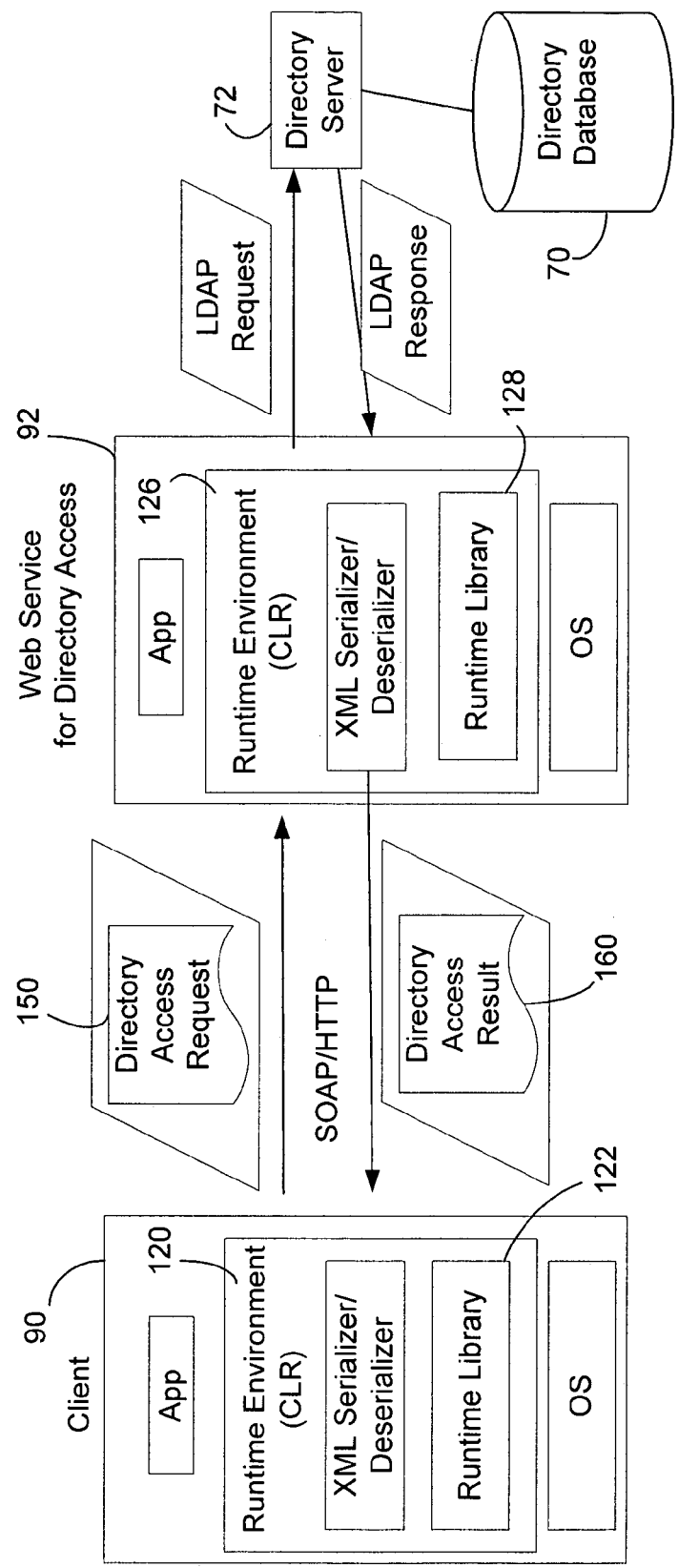
FIG. 4 is a schematic diagram showing a client interacting with the Web service for directory access.

The following description begins with a description of a general-purpose computing device that may be used for implementing either a clients or a server in an embodiment of a system of the invention for accessing directory data as a Web service of the invention, and the system of the invention and its operation will be described in greater detail with reference to FIGS. 2-4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
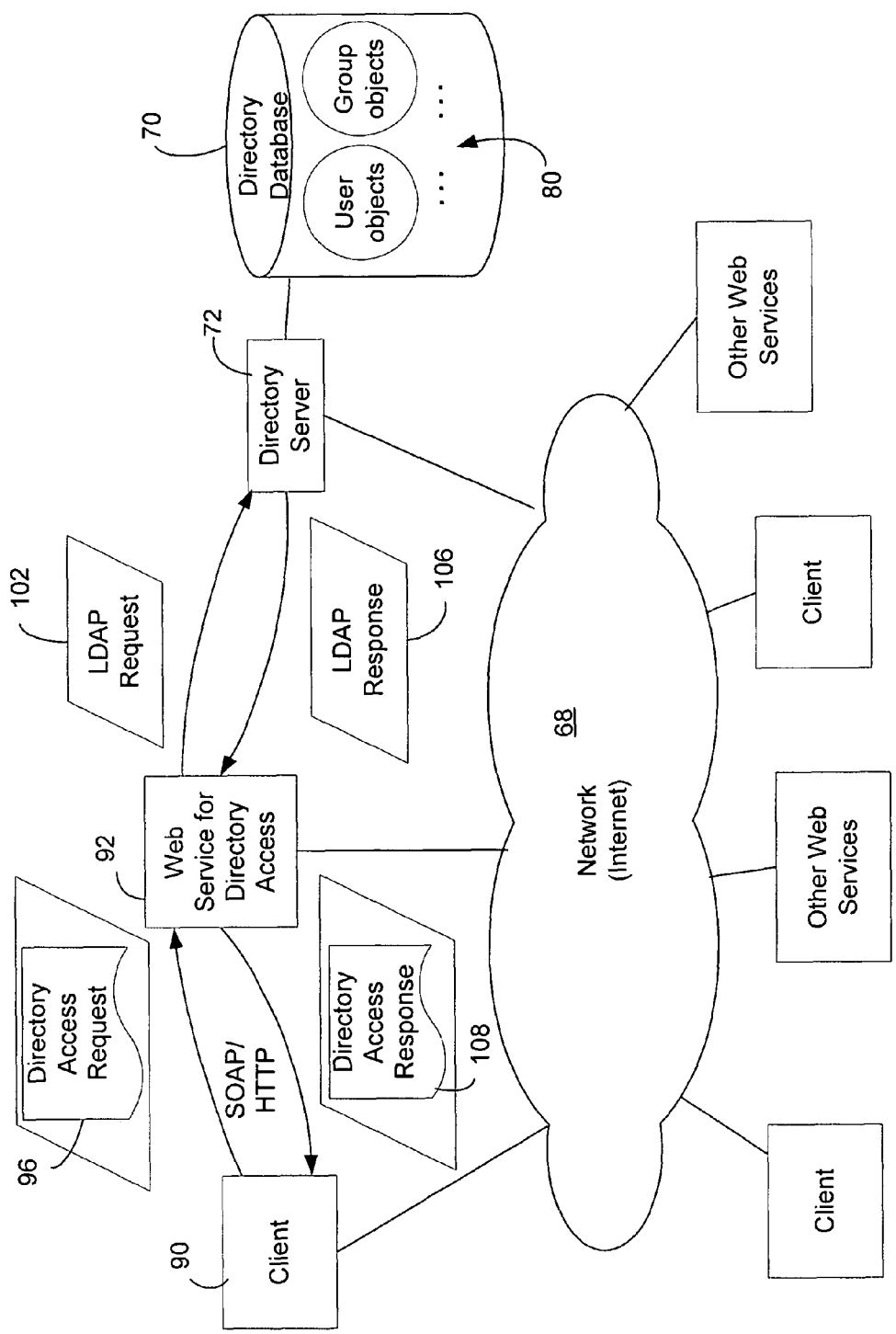
FIG. 2 is a schematic diagram showing a Web service for accessing a directory database on a network such as the Internet.

Referring now to FIG. 2, the present invention is directed to a new approach to accessing a database on a network 68, such as the Internet, as a Web service. In the embodiment shown in FIG. 2, the database is a network directory database. It will be appreciated, however, the system and method of the invention for accessing a database as a Web service can be advantageously applied to other forms of databases or collections of data objects. As shown in FIG. 2, the directory data are stored on a directory database 70, which is typically part of a distributed database system that includes a plurality of local databases distributed over the network. Each directory data is managed by an associated directory server 72, which provides directory service by performing directory operations, such as creation, retrieval, update, delete, search, etc., in response to directory requests from clients on the network. The directory database 70 stores many objects 80 of a plurality of different types. For instance, the object types may include User, Group, Computer, a customized object type such as FabrikamEmployee, etc., and other customized object types provided by extending the schema of the database. To enhance the flexibility of the directory database and to make it adaptive to future needs, the schema of the directory database is preferably extensible. In other words, new types of directory objects may be added to the directory database.

In accordance with an aspect of the invention, to enable network clients 90 to access the directory service in accordance with a Web services model, a Web service 92 for directory access is provided. Although only one Web service for directory access is shown in FIG. 2, it will be appreciated that multiple Web services for that purpose may be deployed on the network 68. The Web service 92 functions as an interface (or intermediary) between the clients 90 and the directory server 72, and communicates with the network clients in accordance with the Web services model. To access the directory data, the clients 72 send their directory requests 96 to the Web service 92. The Web service 92 then converts the directory requests into a format according to a pre-selected directory access protocol, such as LDAP ("Lightweight Directory Access Protocol), that is supported by the directory server, and forwards the directory requests 102 in the converted format to the directory server 72. After the directory server 72 returns the results 106 of the requested directory service operation to it, the Web service 92 then converts the results into the format according the Web services standards, and sends the response message 108 to the client 90. In this regard, the communications between the Web service 92 and the client 72 typically use SOAP over HTTP as the transport.

An embodiment of the method and system of the invention for providing directory data access as a Web service is now described in greater detail with reference to FIGS. 3 and 4. For clarity of description, FIG. 3 shows only one network client 90 that accesses the directory database 70 through the Web service 92. In accordance with an aspect of the invention, the client and the Web service operate in a runtime environment. As part of the runtime environment software 120, the client includes a runtime library 122. Similarly, the Web service also includes runtime environment software 126 and a runtime library 128. Although the inclusion of the runtime libraries is useful and makes programming much easier, it is not a requirement. A simple device may still be used for the directory access operations without having the library installed thereon. If the client library is not used, however, it may have to be programmed at a lower level and may be required to have knowledge of the format of the XML payload. In a preferred embodiment, the runtime environment is the Common Language Runtime (CLR) of Microsoft Corporation.

The communication between the client 90 and the Web service 92 are based on a simple request-response model. To access the functionality provided by the Web service 92, the client 90 sends a request message 96 to the Web service. In the illustrated embodiment, the request message 96 is sent using SOAP over HTTP as the transport. In response, the Web service 92 returns a response message 108 to the client 90, also using SOAP over HTTP as the transport. In alternative embodiments, other transports may be used, since SOAP may run on other transport protocols so that HTTP is not a requirement. As mentioned earlier, it is desirable to provide a simple way to enable the client to access the directory service using methods that conform to the simple CRUD model and can be used to access a set or objects of various and extensible types. As will be described in greater detail below, the approach of the invention effectively achieves this goal.

As mentioned above, the schema of the directory database 70 is preferably extensible to allow addition of new directory object types. The extensibility of the directory schema, however, creates an important issue of how to handle new object types in the context of accessing the directory data via the Web service 90. As described above, to access the directory data, the client 90 sends a request to the Web service 92 to invoke a method for the desired directory operation. The issue is how to specify the type of directory objects on which the method should operate. It is possible to define a set of directory operation methods for each object type in the database. That approach, however, is not satisfactory, because it is not desirable to have to create new methods for each new data type added to the database.

Moreover, unlike the case of a relational database model, a directory search often produces results that include a heterogeneous set of object types. In other words, the result of a directory search may be a "non-rectangular" set that contains multiple different object types each having a different set of properties. Expressing a result set that may contain heterogeneous object types via the Web service is another challenge in addition to the ones mentioned earlier.

In accordance with a feature of the invention, these issues are effectively addressed by combining the aspects of object-oriented programming with the capability of the Web services runtime mechanism to have knowledge to serialize objects to a specific type based on metadata. which may be obtained by the client via WSDL information from the server. Specifically, instead of defining a set of directory access methods for each object type found in the directory database, the various existing and future directory object types are defined as classes derived from a generic directory object class for which a simple set of directory operations (the CRUD model) are defining. The definitions or the directory object types that can be accessed by the directory operations are also included in the information provided by the Web service 92 to the client 90 to tell the client how to use its services. In an preferred embodiment, the definitions of the directory object types are in the XML format. The inclusion of the object type definitions and the use of the runtime library of the client to create instances of the objects using the definitions allow the client to pass properly constructed objects in its request to the Web service 92. This enables the Web service 92 to use the objects to interest with the directory server to carry out the intended directory operations.

```
[XmlInclude(typeof(Group))]
[XmlInclude(typeof(User))]
[XmlInclude(typeof(FabrikamEmployee))]
public class Entry
{
    public Guid guid;
    public string Name;
    public string Path;
}
public class Group : Entry
{
    public int Type;
    public string[] Members;
}
public class User : Entry
{
    public string UserName;
    public string Password;
        public DateTime LastLogoff;
}
class FabrikamEmployee : User
{
    public int EmployeeID;
    public DateTime StartDate;
    public int Level;
}
[WebService(Namespace="http://microsoft.com/activedirectory/
webservices/")]
class MyWebService : System.Web.Services.WebService
{
  [WebMethod]
  // the return type (e.g Entry[]) allows a heterogenous result set.
  // the Entry parameter allows the user to query by example
    public Entry[] Search(Entry e)
    {
        ...
    }
    public Entry[] Search(Entry[] e) // union searches
    {
        ...
    }
    public Entry[] Search(string queryString)
    {
        ...
    }
    public void Create(Entry e)
    {
        ...
    }
    public void Create(Entry[] e) // batch create
    {
        ....
    }
    public void Update(Entry e)
    {
        ...
    }
    public void Update(Entry[] e) // batch updates
    {
    }
    public void Delete(Entry e)
    {
        ...
    }
    public void Delete(Entry[] e) // batch delete
    {
        ...
    }
}
```

In this example, the generic object type class is named "Entry," and all classes for the directory object types are derived from it. The data members of the Entry class include a GUID, a name, and a path (which refers to the directory database hierarchy). In the sample code, two directory objects types, "User" and "Group," are derived from the Entry class and each has its own data members. Other exemplary directory operations, Search, Create, Update and Delete, are defined as methods of a "MyWebService" class derived from a "System.Web.Services.WebService" class. The WebService namespace for these classes is specified as, for example: "http://microsoft.com/activedirectory/webservices/".

In accordance with a feature of the embodiment, an "XmlInclude" element is included in the source code to indicate to the runtime environment of the client that the class definition for each directory object type should be used, instead of that of the generic object type class, when creating an object of that given type. For instance, the sample code above has three "XmlInclude" statements for the directory objects types of User, Group, and FabrikamEmployee, respectively. When the Xml Serializer of the client serializes objects that include both the base class and the derived class, it can then recognize both object types. The XmlInclude attribute on the server side also allows the deserializer of the server to recognize the object types of the serialized objects. The effect of these XmlInclude elements in the process of creating a directory access request will be described in greater detail below.

Another feature of the embodiment that should be noted is that the Search method in this example is defined such that it can return an array as the result of the search operation. This enables the search operation to produce a heterogeneous result set, in addition, the Search method takes a flexible input parameter. In one case, it takes the object itself. This allows the user In specify the filter by setting object properties. The advantage of this approach is it does not force the user to learn a certain query language or syntax such as SQL or LDAP Filter. This technique is known as Query By Example. In other case, the search takes a query string for more advanced developers. Also, the Create method is defined such that it can take an array as an operand. This allows the creation of directory objects as a batch operation, i.e., sending one Create request to create multiple directory objects, which may be of different object types.

As mentioned above, the class definitions, including the definitions for the various object types of the directory database, are provided by the Web service 92 to clients 90. When the client 90 wants to use the Web service 92 for accessing the directory database, it may need to learn first about the types of directory objects in the database and the methods that it can use to perform database operations on those objects. To that end, as shown in FIG. 3, the client 90 sends an initial query message 110 to the Web service 92 for the needed information. In one embodiment, the source code with the class definitions like the sample described above has been compiled into an "intermediate" language (e.g., the Microsoft Intermediate Language (MSIL)) of the runtime environment. In response to the query from the client, a WSDL component 112 of the runtime environment 126 of the Web service 92 converts the compiled code 114 into a WSDL document 116, which is then sent to the client 90 in a message 118. When the client receives the response, its runtime environment converts the WSDL document 116 back into the compiled form.

To illustrate how the directory access operations are invoked, a sample of the code on the client is provided below.

```
// Searching Directory
Entry e = new Entry( );
    e.Name = "John";
    Entry[] res = src.Search(e); // example of heterogenous result set
    foreach( Entry r in res )
    {
```

-continued

```
    if ( e is User )
    {
        // do something
    }
    else if ( e is FabrikamEmployee )
    {
        // do something else
    }
}
// Web Service User/Group Creation
webSrv.Create(new User("John", "Smith", "jsmith"));
webSrv.Create(new Group("Executives", GroupType.Secure));
// Web Service Batch User/Group and Vendor specific creation.
webSrv.Create( new object[]
{
new User("John", "Smith", "jsmith"),
new Group("Executives", GroupType.Secure),
new FabrikamEmployee("Barb","Johnson", 48724, 16);
}
);
```

This sample code includes multiple operations. Each operation is sent as a request to the Web server 92. One of the operations is a search operation that may return a heterogeneous result set. This is by means of the statement: "Entry[ ] res=src.Search(e);". In this example, the search term is the name "John". Objects matching this search term are returned. Depending on the schema of the directory database, the result of the search may include data of different types. For instance, the search may locate User and FabrikamEmployee objects that contain the name "John."

The sample code also includes simple Create operations for creating a User object and a Group object in the directory database. Moreover, the sample code includes an example of a batch creation operation. In this example, a User object, a Group object, and a FabrikamEmployee object are created by a single Create statement.

Referring again to FIG. 4, for each invocation of the directory access methods (e.g., Search and Create) in the client's code, a request 150 is sent to the Web service 92 in a message 132. In the illustrated embodiment, the message is sent using SOAP over HTTP as the transport. This message is constructed by the runtime environment 120 (e.g., CLR) on the client 90. The runtime environment 120 includes a runtime library 122, which looks up the class definition for each object type referred to in the directory access operation statement in the code. As described above, all the methods for directory operation methods are defined for the generic object class ("Entry" in the sample code above), even though the method in the request may be invoked with respect to a specific object type derived from the generic object class. The XmlInclude statement for a given object type tells the runtime library that the class definition for that object type, rather than the class definition for the generic object type class, namely "Entry," should be used in creating an object of that type. For instance, for the operation of creating a User object in the directory, instead of creating a corresponding object with only GUID, name, and path as its data members as defined in the Entry class, the Web service can correctly create an object that has UserName, Password, and LastLogoff as it data members. Thus, for the "webSrv.Create(new User("John", "Smith", "jsmith"));" statement in the sample client code above, the runtime library 122 looks up the definition for the User class. When it sees the "[XmlInclude(typeof(User))]" element, it knows that the class definition of the User object type, instead of that of the generic object type class Entry, should be used to construct an User object. After the object is created according the correct class definition, the runtime environment of the client serializes the object and includes it in the request message. The request message is then sent to the Web service via SOAP over HTTP.

When the Web service 92 for directory access receives the request 132, it deserializes the objects in the request. The objects received from the client provide the parameters for the requested directory operation. For instance, the Web service can tell that an object is of the User type and has "John," "Smith," and "jsmith" as its data. With the information obtained from the deserialized objects, the Web service initiates an LDAP session with the directory server 72 to carry out the directory operation methods specified in the request 132. After the directory server 92 carries out the requested directory access operation, the result of the operation is returned to the Web service in an LDAP response 156. The Web service then generates a response message 160 containing the result, and sends the response message via SOAP over HTTP to the client 90. For instance, if the requested operation is a search for a given name attribute, then the search result, which may be a heterogeneous set of data, is put in an array in the response message and sent to the client.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for a client on a computer network to use a Web service to access, via a server, a database directory for discovering other Web services accessible on the network, the computer-readable medium comprising computer-executable instructions for:

receiving a description document from the server for describing a Web service which interacts with the server to discover other Web services listed in a database directory of Web services, the description document having:

class definitions for a generic object class;

a plurality of object type classes derived from the generic object class, wherein each of the plurality of object type classes corresponds to a type of object in the database directory of Web services;

a Web service class that includes a plurality of database operation methods defined within the Web service class, the plurality of database operation methods being defined for operating on instances of database objects within the database directory of Web services, wherein each of the plurality of database operation methods is defined for the generic object class, and wherein the Web service class is derived from a parent class; and at least one flag statement identifying an object type;

in response to receiving the description document, the client converting the description document from a schema-based language for describing Web services into an intermediate language for a runtime environment; and generating a database access request message for performing a database operation on a selected object type in the database directory of Web services, including:

determining whether the selected object type is the object type identified by the flag statement;

if the selected object type is the object type identified by the flag statement, creating an object of the selected object type using the class definition for the selected object type in the received description document and generating a database operation method for the selected object type, the database operation method for the selected object type being based on one of the database operation methods defined for the generic object class; and serializing the created object of the selected object type and including the serialized object in the request message.

2. A computer-readable medium as in claim 1, wherein the description document is in the Web Services Description Language.

3. A computer-readable medium as in claim 2, wherein the step of receiving includes the client converting the description document into a compiled software format.

4. A computer-readable medium as in claim 3, wherein the compiled software format is for an intermediate language for a computer runtime environment.

5. A computer-readable medium as in claim 1, wherein the database operation methods includes a search method.

6. A computer-readable medium as in claim 5, wherein the search method returns an array as search result.

7. A computer-readable medium as in claim 1, wherein the database operation methods includes at least one method with an array as an operand.

8. A computer-readable medium as in claim 7, wherein the at least one method is a create method.

9. A Web service as recited in claim 1, wherein the plurality of database operations includes one or more batch operations.

10. A computer-readable medium having computer-executable instructions for a database server of a runtime environment platform to provide a Web service of discovering other Web services by accessing a database directory of Web services, comprising computer-executable instructions for:

receiving, at a Web service, a query from a client;

in response to receiving the query from the client, the Web service:

accessing source code having class definitions compiled into an intermediate language of a runtime environment;

converting the compiled source code in the intermediate language of the runtime environment into a schema-based language for describing Web services in description documents;

sending, in response to the query from the client, a description document to the client in the schema-based language, the description document describing a Web service which interacts with the server to discover other Web Services listed in a database directory of Web services, the description document containing:

class definitions for a generic object class;

a plurality of object type classes derived from the generic object class, wherein each of the plurality of object type classes corresponds to a type of object in the database directory of Web services;

a Web service class that includes a plurality of database operation methods defined within the Web service class, the plurality of database operation methods being defined for operating on instances of database objects within the database directory of Web services, wherein each of the plurality of database operation methods is defined for the generic object class and wherein the Web service class is derived from a parent class;

receiving a request message from the client for performing a requested database operation method, the request message including a serialized object for the requested database operation method;

deserializing the serialized object;

identifying an object type and parameters of the deserialized object; and accessing the database directory of Web services to carry out the requested database operation method based on the object type and parameters of the deserialized object.

11. A computer-readable medium as in claim 10, having further computer-executable instructions for performing the step of returning a result of carrying out the requested database operation method.

12. A computer-readable medium as in claim 11, wherein the requested database operation method is a search method, and wherein the result of the requested database operation method includes an array.

13. A computer-readable medium as in claim 10, wherein the requested database operation method has an array as an operand, and the request message includes a plurality of serialized objects of different object types corresponding to elements of the array.

14. A computer-readable medium as in claim 10, wherein the description document is in the Web Services Description Language (WSDL).

15. A computer-readable medium as in claim 14, wherein the step of sending the description document includes converting a compiled code module into the description document.

16. A computer-readable medium as in claim 15, wherein the compiled code module is in an intermediate language for a runtime environment platform.

17. A computer-readable medium as in claim 10, wherein the step of accessing the database to carry out the requested database operation method includes communicating with a database server for the database directory of Web services.

18. A computer-readable medium as in claim 17, where communicating with the database server is according to a directory access protocol.

19. A computer-readable medium as in claim 18, wherein the database access protocol is the Lightweight Directory Access Protocol (LDAP).

20. A client computing system connected to a database directory over a computer network, the client system being configured to use a Web service to access, via a server, the database directory to discover other Web services accessible on the computer network, the client computing system comprising:

a processor; and computer-readable medium having stored thereon computer-executable instructions that, when executed by the processor, cause the client computing system to:

receive a description document from the server for describing a Web service which interacts with the server to discover other Web services listed in a database directory of Web services, the description document having:

class definitions for a generic object class;

a plurality of object type classes derived from the generic object class, wherein each of the plurality of object type classes corresponds to a type of object in the database directory of Web services;

a Web service class that includes a plurality of database operation methods defined within the Web service class, the plurality of database operation methods being defined for operating on instances of database objects within the database directory of Web services, wherein each of the plurality of database operation methods is defined for the generic object class, and wherein the Web service class is derived from a parent class; and at least one flag statement identifying an object type;

in response to receipt of the description document, convert the description document from a schema-based language for describing Web services into an intermediate language for a runtime environment; and generate a database access request message for performing a database operation on a selected object type in the database directory of Web services, including:

determining whether the selected object type is the object type identified by the flag statement;

if the selected object type is the object type identified by the flag statement, create an object of the selected object type using the class definition for the selected object type in the received description document and generating a database operation method for the selected object type, the database operation method for the selected object type being based on one of the database operation methods defined for the generic object class; and serialize the created object of the selected object type and including the serialized object in the request message.

21. A server computing system connected to a database directory and a client computing system over a computing network, the server computing system being configured to enable the client computing system to discover Web services by the database directory, comprising:

a processor; and computer-readable media having stored thereon computer-executable instructions that, when executed by the processor, cause the server computing system to access a Web service, the Web service being configured to:

receive a query from a client;

in response to receiving the query from the client:

access source code having class definitions compiled into an intermediate language of a runtime environment;

convert the compiled source code in the intermediate language of the runtime environment into a schema-based language for describing Web services; and send, in response to the query from the client, a description document to the client in the schema-based language, the description document describing a Web service which interacts with the server to discover other Web services listed in a database directory of Web services, the description document containing:

class definitions for a generic object class;

a plurality of object type classes derived from the generic object class, wherein each of the plurality of object type classes corresponds to a type of object in the database directory of Web services;

a Web service class that includes a plurality of database operation methods defined within the Web service class, the plurality of database operation methods being defined for operating on instances of database objects within the database directory of Web services, wherein each of the plurality of database operation methods. is defined for the generic object class and wherein the Web service class is derived from a parent class;

receive a request message from the client for performing a requested database operation method, the request message including a serialized object for the requested database operation method;

deserialize the serialized object;

identify an object type and parameters of the deserialized object; and access the database directory of Web services to carry out the requested database operation method based on the object type and parameters of the deserialized object.

* * * * *